April 16, 1957 H. C. RHODES 2,788,752
PARTER FOR DOUGH SHEETING ROLLS
Filed Feb. 9, 1955 2 Sheets-Sheet 1
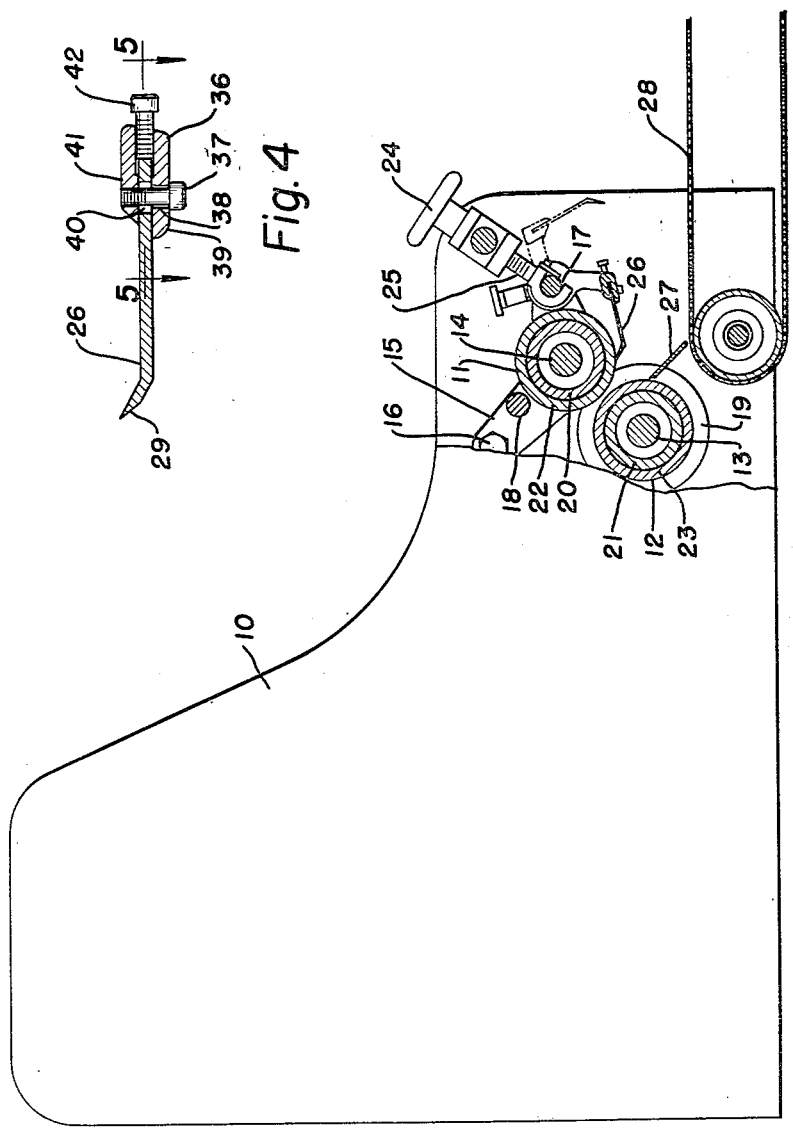
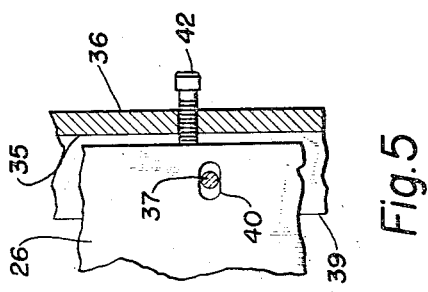
INVENTOR.
Herbert C. Rhodes
BY
Otto Moeller
Attorney

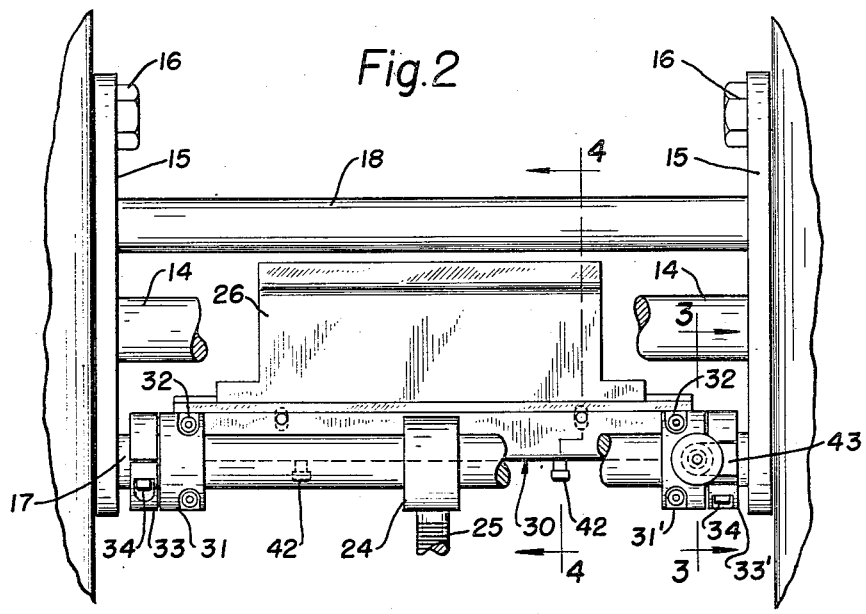
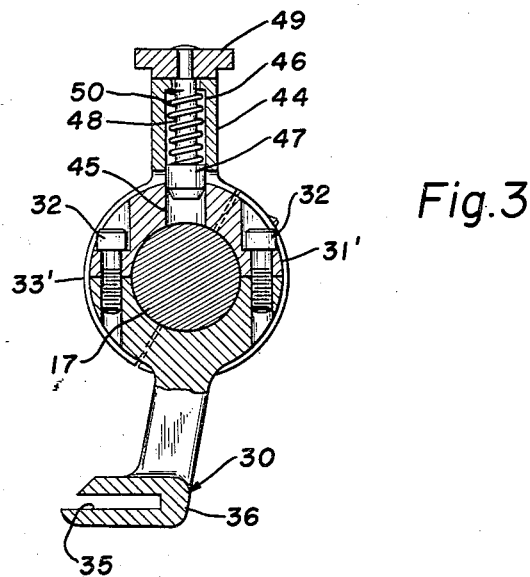

United States Patent Office 2,788,752
Patented Apr. 16, 1957

2,788,752

PARTER FOR DOUGH SHEETING ROLLS

Herbert Cecil Rhodes, Portland, Oreg., assignor, by mesne assignments, to Capitol Products Corporation, Mechanicsburg, Pa., a corporation of Pennsylvania Application February 9, 1955, Serial No. 487,056

2 Claims. (Cl. 107—12)

This invention relates to new and useful improvements in dough molders of the type in which lumps of dough are passed through successive pairs of cooperating sheeting rolls whereby the dough is rolled out into elongated flattened sheets, and relates more particularly to a novel and improved means for parting or facilitating the separation of the sheeted dough piece from the sheeting rolls as the sheeted dough pieces emerge therefrom.

Sheeted dough pieces as they emerge from the bight of a pair of cooperating sheeting rolls have a tendency to cling to one or the other of the rolls, and this tendency to cling is more pronounced in the lowermost pair of cooperating sheeting rolls since these rolls are spaced closer together than the preceding pair or pairs of cooperating sheeting rolls. The invention is therefore shown and described as applied to the lowermost pair of cooperating sheeting rolls of the molder, though it may be applied to advantage to other pairs of sheeting rolls.

The tenacity with which the sheeted dough pieces cling to the sheeting rolls varies considerably under different conditions, for example, dusting the rolls with flour reduces the cling, also certain materials are more inadhesive to dough than others, so that by selection of the material for the peripheral surface of the rolls, the degree of cling can be minimized. However, even under the most favorable conditions it has been found advantageous if not absolutely essential to employ means for parting the dough sheets from the rolls as they emerge from the bight of the rolls.

Such parting means are generally in the form of a plate disposed in a plane parallel with respect to the axis of the roll and having a tapered edge adjacent the periphery of the roll. In such instances where the peripheral surface of the roll is a hard material such as steel, it is preferable to have the tapered edge of the plate just touching the roll. However, if the peripheral surface of the roll is of a softer material such as polytetrafluoroethylene, it is preferable to have the tapered edge of the plate spaced from the roll with a very small clearance, preferably about .002 of an inch. Setting of these plates is a delicate and painstaking operation and once properly set it is of course desirable to maintain this setting.

At times, small pieces of dough will adhere to these plates particularly adjacent their beveled edge and as the dough builds up and becomes hard it may mutilate the dough sheet and where rolls having a comparatively soft peripheral surface are employed, such as polytetrafluoroethylene covered rolls, they may become scored due to the abrasive and cutting action of the hardened dough. It is therefore necessary at times to clean off the hardened dough that accumulates on the plate. Because of space restrictions it is difficult to clean off the plate so that it has been customary to physically remove the plate which heretofore has been fixed in position, and after cleaning it going through the painstaking job of resetting it in its proper location with respect to the roll.

The invention therefore contemplates the provision of a dough sheet parter that is conveniently and simply swung outwardly and away from the roll with which it cooperates in its normal or operating position to separate or part dough sheets, so that it is readily accessible for cleaning and also when so swung from its normal position permits greater accessibility to the parter or guide for the companion roll.

The invention further contemplates a swinging parter that after having been swung from its originally adjusted relation with respect to its roll is returnable to its originally adjusted position without making any further adjustments or resettings thereof.

A further object of the invention is to provide in such a swinging parter, simple and efficient means for originally adjusting the blade of the parter with respect to the roll with which it cooperates to part or separate dough sheets.

With these and other objects in view, the invention consists in the novel and improved constructions, combinations and arrangement of parts hereinafter described, a preferred embodiment of which is illustrated in the accompanying drawings, in which:

Figure 1 is a side elevation of a dough sheeting molder head with a portion broken away showing the lower pair of cooperating sheeting rolls in section with the swinging parter assembly applied thereto;

Figure 2 is a plan view of the broken away portion of Figure 1 looking in the direction of the arrows of line 2—2 of Figure 1, with parts broken away to more clearly reveal the swinging parter assembly;

Figure 3 is a sectional view through the parter assembly with the parter blade removed, taken on the line 3—3 of Figure 2;

Figure 4 is a sectional view through the parter assembly taken on the line 4—4 of Figure 2, showing the means for adjusting the parter blade; and Figure 5 is a sectional view taken on line 5—5 of Figure 4.

The numeral 10 designates a dough sheeting molder head of a dough molder, only such parts thereof being shown as are necessary to a complete understanding of the invention. Such dough sheeting molder heads are well known in the art and comprise a plurality of pairs of cooperating rolls through which lumps of dough, of the proper weight for producing loaves of bread, are successively passed to sheet them into flat oval or elliptical pan cake shape. The molder head may be of a design as shown, for example, in my Patent No. 2,605,723. One pair of sheeting rolls is illustrated in Figure 1 and the individual rolls are numbered 11 and 12, respectively. Additional sets of rolls may and preferably are employed, each set of rolls being spaced closer together than the preceding set for progressively sheeting the dough piece.

The sheeting roll 12 is mounted on a shaft 13 journaled in suitable bearings on the frame of the molder head 10 and is driven by suitable driving mechanism. The mounting and driving mechanism for the roll 12 is preferably as shown in my above referred to patent, and since it does not constitute a part of the present invention, it is not shown in the drawings and need not be further described. The cooperating sheeting roll 11 is mounted on a shaft 14 supported at opposite ends in respective frame members 15, which frame members are pivotally mounted on the inner faces of frame members of the molder head 10 by means of pins 16. The drive mechanism for the roll 11 is preferably as shown in my above referred to patent, and since it does not constitute a part of the present invention, it is not shown in the drawings nor hereinafter described. The frame members 15 are retained in spaced relation by a shaft 17 rigidly mounted in the ends of the frame members 15.

opposite their pivotal mounting. The shaft 14 of roll 11 is, as shown in Figure 1, thus supported by the frame members 15 between their pivotal mounting and the shaft 17. An additional rod 18 may be provided for retaining the frame members 15 in spaced relation.

In accordance with general practice one of the cooperating rolls, as 12, is provided with end flanges 19, one such end flange being shown in Figure 1, projecting beyond the cylindrical surface of the roll 12, between which flanges the roll 11 is received. These flanges prevent the dough from overlapping the ends of the rolls during the sheeting operation.

The cores 20, 21 of the rolls 11, 12 respectively, have their cylindrical surfaces enveloped by plastic composition coverings 22 and 23, respectively, selected for their low adhesive factor for dough. One such material is polytetrafluoroethylene, known by the trade name "Teflon."

The spacing between the sheeting rolls 11 and 12 is adjusted by handwheel 24 located on the centerline of the molder head. The adjusting means shown in Figure 1 is the same as that described and illustrated in my above referred to patent, to which reference is had, it being sufficient here to point out that, turning of handwheel 24 imparts movement to the shaft 17 through the hooked screw member 25. Movement of the shaft 17 causes the frame members 15 to pivot about the pins 16 and thus move the roll 11 toward or away from the roll 12.

As the sheets of dough emerge from the sheeting rolls 11 and 12, they will frequently cling to and follow around with one or the other of the rolls. It has therefore been customary to provide metallic platelike parting blades for separating the dough sheets from the rolls. The plastic coverings 22 and 23 are comparatively soft and therefore likely to be damaged by contact with the parter blades, so that it has been customary to provide a slight clearance between the peripheral surface of the rolls and the edge of the parter blade. This clearance is made as small as practicable, preferably about .002 of an inch, so that the dough sheet does not catch against the edge of the parter blade, and is cleanly separated from the roll. The setting of the parter blade is a meticulous and painstaking job.

After a time dough gradually builds up on the parter blade along its edge adjacent the roll, and as this dough builds up and becomes hard, it will score and damage the plastic surface of the sheeting roll. It is consequently necessary at times to clean the parter blade but because of space restrictions it has in the past been necessary to physically remove the parter blade for cleaning and then go through the tedious process of resetting it. The parter arrangement hereinafter described avoids these difficulties and objections.

The parter blade 26, which cooperates with roll 11 to separate dough sheets therefrom, is adapted to have a swinging or pivotal movement toward and away from the roll 11, and referring to Figure 1 is shown in full lines in its fully extended or operative position and in dot and dash lines in its fully retracted position, where it is easily accessible for cleaning. In this fully retracted position of the parter blade 26, greater accessibility is also provided for cleaning the fixed parter blade or guide 27 that cooperates with the lower roll 12 for separating dough sheets therefrom and guiding them to the take away conveyor 28. The parter blade 26, as best shown in Figure 4, is provided at its free end with a beveled separating edge portion 29.

The swinging movement of the parter blade 26 is provided for by means of a pivotally mounted support comprising a yoke member 30, the arms of which carry bearings 31 and 31¹ rotatably mounted on the transverse shaft 17. For convenience in assembling, the bearings 31 and 31¹ are preferably split as shown in Figure 3, the two parts being secured together by screws 32. The yoke member 30 is maintained against movement axially of the shaft 17 by means of the split collars 33 and 33¹ which are rigidly clamped on the shaft 17 by the screws 34 securing the split sections of the collars together.

The end of the parter blade 26 opposite its beveled edge portion 29 is received in a slot 35 extending the full length of the cross bar 36 of the yoke member 30. Cap screws 37 extending through openings 38 in one of the tongues 39 of the cross bar 36 formed by the slot 35, and through elongated openings 40 in the parter blade 26, and threaded into the other of the tongues 41 of the cross bar 36 formed by the slot 35, secure the parter blade 26 in the cross bar 36. The tongues 39 and 41 yield sufficiently when the cap screws 37 and drawn up tightly to rigidly clamp the parter blade 26 in position. Threaded in the end of the cross bar 36 opposite the slot 35 are transversely spaced cap screws 42, the inner ends of which are arranged to engage the end of the parter blade 26 in the slot 35. Thus, with the yoke member 30 locked in the full line position, as shown in Figure 1, by means hereinafter described, the cap screws 42 are retracted so that the parter blade 26 can be inserted the full depth of the slot 35. Then, by advancing the cap screws 42 to engage and move the parter blade 26 forwardly in the slot 35, the parter blade is conveniently and accurately adjustable to provide the desired clearance between the roll 11 and the beveled edge 29 of the parter blade 26. By drawing up on the cap screws 37, the parter blade is securely held in such position by the yoke member 30.

The locking means above referred to, for locking the yoke member and consequently the whole parter assembly in operative position, will now be described. The collar 33¹ which, as before stated, is rigidly clamped on the rigid shaft 17, is provided with a radially projecting lug 43 having a laterally extending boss 44 overlying the adjacent bearing 31¹ of the yoke member 30. The bearing 31¹ and the overlying boss 44 are provided with openings 45 and 46, respectively, arranged to be in register when the parter assembly is in operative position. A buttonlike member 47 is received and has a sliding fit in the openings 45 and 46 normally engaging both the bearing 31¹ of the yoke member 30 and the boss 44, thereby retaining them in locked relation. The buttonlike member 47 has a stem 48 of reduced diameter extending through the opening 46, and a knob 49 carried by the projecting end of the stem 48 and overlapping the opening 46 prevents inward or downward movement of the buttonlike member 47 from its position as shown in Figure 3. A spring 50 in the opening 46 around the stem 48 bearing at one end against the button member 47 and at the other end against a shoulder formed in the boss 44, normally prevents outward or upward movement of the button member 47 from its position as shown in Figure 3.

In order to swing the yoke member 30 and parter blade 26 from its operative position to the position shown in dot and dash lines in Figure 1, when it is desired to clean to the parter blade 26 or to gain access to the parter guide 27 for purpose of cleaning, it is only necessary to grasp the knot 49 and pull the button member 47 outwardly or upwardly against the pressure of spring 50 until it is disengaged from the bearing 31¹. Upon completion of the cleaning operation the yoke member 30 can be swung back and as soon as openings 45 and 46 come into register, the spring 50 will force the button member into the opening 45 of the bearing 31¹ whereby the parter assembly will be returned to and locked in its originally adjusted position.

It will be apparent from the above that the parter blade 26 is thus always returnable to its originally adjusted position without manual resetting or regaging the parter blade.

I claim:

1. In a mechanism of the class described, a dough sheeting roll, a parter member for separating sheets of dough from said dough sheeting roll, said parter member including a yoke pivotally mounted on an axis parallel and horizontally spaced with respect to the axis of said sheeting roll and a parter blade mounted on the free end of said yoke and extending angularly therefrom, said parter member being swingable about the pivotal mounting of said yoke to move said parter blade in an orbit between an operative position wherein said blade extends from said yoke in a direction toward said sheeting roll with the free end closely adjacent the lower peripheral portion thereof and an inoperative position wherein said blade on the yoke extends in opposite direction away from said sheeting roll with the free end remote from the periphery of said sheeting roll, and means for orienting and releasably locking said parter member in its operative position with respect to said sheeting roll including a fixed member and releasable means carried by one of said members engageable with the other of said members when said parter member is in its operative position for releasably locking said parter member in said operative position.

2. In a mechanism of the class described, a dough sheeting roll, a fixed shaft in spaced parallel relation with respect to the axis of said sheeting roll, parter means for separating sheets of dough from said dough sheeting roll, said parter means including a yoke pivotally mounted on said fixed shaft and a parter blade mounted on the free end of said yoke and extending angularly therefrom, said parter means being swingable about the pivotal mounting of said yoke to move said parter blade in an orbit between an operative position wherein said blade extends from said yoke in a direction toward said sheeting roll with the free end closely adjacent the lower peripheral portion thereof and an inoperative position wherein said blade on said yoke extends in opposite direction away from said sheeting roll with the free end remote from the periphery of said sheeting roll, collar means rigidly mounted on said shaft restraining axial movement of said parter means along said shaft, openings in said collar means and said parter means arranged to be in alignment when said parter means is swung to its operative position and releasable locking means carried by one of said means for locking said parter means in operative position including a pin engageable with said aligned openings and resilient means for retaining said pin engaged, said pin being removable from one of said openings against the pressure of said resilient means for swinging said parter means away from the periphery of said sheeting roll.

References Cited in the file of this patent

UNITED STATES PATENTS

| Number | Name | Date |
|---|---|---|
| 324,529 | Bromley et al. | Aug. 18, 1885 |
| 2,034,346 | Lauterbur | Mar. 17, 1936 |
| 2,246,758 | Roth | June 24, 1941 |
| 2,596,215 | Crosland | May 13, 1952 |
| 2,605,723 | Rhodes | Aug. 5, 1952 |